United States Patent
Terada et al.

(10) Patent No.: US 7,806,573 B2
(45) Date of Patent: Oct. 5, 2010

(54) HEADLAMP FOR VEHICLE

(75) Inventors: Tatsuhiro Terada, Shizuoka (JP);
Tomoharu Mochizuki, Shizuoka (JP)

(73) Assignee: Koito Manufacturing Co., Ltd., Tokyo (JP)

( * ) Notice: Subject to any disclaimer, the term of this patent is extended or adjusted under 35 U.S.C. 154(b) by 280 days.

(21) Appl. No.: 11/856,574

(22) Filed: Sep. 17, 2007

(65) Prior Publication Data
US 2008/0175017 A1    Jul. 24, 2008

(30) Foreign Application Priority Data
Sep. 19, 2006    (JP)    ............................. 2006-253537

(51) Int. Cl.
*B60Q 1/00* (2006.01)
(52) U.S. Cl. ................. 362/539; 362/507; 362/523; 362/543; 362/544; 362/545; 362/546
(58) Field of Classification Search ................. 362/539, 362/507, 523, 543, 544, 545, 546
See application file for complete search history.

(56) References Cited

FOREIGN PATENT DOCUMENTS

| JP | 2006-49189 A | 2/2006 |
|---|---|---|
| JP | 2006196410 A * | 7/2006 |

OTHER PUBLICATIONS

English Translation of Japanese Patent JP0200619610 A, Headlamp for Vehicle, Jul. 27, 2006.*
Patent Abstracts of Japan, Publication No. 2006-049189, Publication Date: Feb. 16, 2006, 2 pages.
* cited by examiner

*Primary Examiner*—Sandra L O'Shea
*Assistant Examiner*—Jessica L McMillan
(74) *Attorney, Agent, or Firm*—Osha Liang LLP

(57) ABSTRACT

A headlamp for a vehicle includes a lighting unit and an extension for covering a clearance between a lamp body and the lighting unit in a lighting chamber formed by the lamp body and a cover. The lighting unit includes a light source bulb and a reflector for reflecting a direct light emitted from the light source bulb in a forward direction. The extension includes a first extension having a bottom side front end taking a substantially dogleg-shaped section in which a bent portion is turned in a forward direction of the vehicle, and a second extension positioned behind the first extension and having a front edge on an internal surface of a bottom side lighting unit positioned below a rear edge of the internal surface of the lighting unit in a bottom side front end of the first extension.

11 Claims, 6 Drawing Sheets

ND LAMP FOR VEHICLE

This application claims foreign priority from Japanese Patent Application No. 2006-253537 filed on Sep. 19, 2006, the entire contents of which are hereby incorporated by reference.

BACKGROUND OF THE INVENTION

1. Field of the Invention

The present invention relates to a headlamp for a vehicle which is provided with an extension for covering a clearance between a lamp body and a lighting unit.

2. Background Art

In a headlamp for a vehicle, generally, a lighting unit is accommodated in a lamp body in such a manner that an irradiating angle can be regulated through an aiming mechanism (for example, see Patent Document 1).

As shown in FIG. 6, in a conventional headlamp 1 for a vehicle, a lighting unit 9 is accommodated in a lighting chamber 7 formed by a lamp body 3 and a translucent cover 5 attached to an opening portion on a front end thereof. The lighting unit 9 has an optical axis Ax extended in a longitudinal direction of the vehicle, and is supported in the lamp body 3 to be tiltable invertical and transverse directions through an aiming mechanism 11.

An extension 13 is provided in the lighting chamber 7 along a periphery of the translucent cover 5. The extension 13 is provided with an opening portion 15 for surrounding the lighting unit 9 in the vicinity of a front end thereof.

The lighting unit 9 is of a projector type and includes a light source bulb 17, a reflector 19, a lens holder 21, a projection lens 23, and a shade 25. The projection lens 23 is constituted as a planoconvex lens in which a forward side surface 23$a$ is a convex curved surface and a rear side surface 23$b$ is a plane, and is disposed on the optical axis Ax. The projection lens 23 serves to forward project, as an inverted image, an image on a focal plane including a focal point F on a rear side thereof.

The reflector 19 is supported in the lamp body 3 through the aiming mechanism 11 by an aiming bracket 27. The reflector 19 has a reflecting plane 19$a$ for reflecting a light emitted from a light source forward close to the optical axis Ax.

The shade 25 is fixed and supported on the lens holder 21 so as to be positioned in an almost lower half part in an internal space of the lens holder 21 and serves to shield a part of a light reflected by the reflector 19 and to remove most of an upward light emitted forward from the projection lens 23.

The headlamp 1 for a vehicle can regulate an irradiating angle of the lighting unit 9. Therefore, a clearance is present between the lamp body 3 and the lighting unit 9. The extension 13 is provided in such a manner that the clearance is not visually recognized from outside. Conventionally, the extension 13 has the opening portion 15 in a central part, and is integrally molded by a resin material and is thus constituted by one sheet. Moreover, a bright treatment, such as an aluminum evaporation, is carried out to have continuity with respect to the design of the reflector 19.

[Patent Document 1] JP-A-2006-49189 Publication

SUMMARY OF THE INVENTION

When the extension 13 is constituted by one sheet through integral molding, however, a mold releasing taper is to be maintained. For this reason, a bottom side front end 13$a$, which is bent to have an almost dogleg-shaped section toward a forward part of a vehicle, cannot be formed to be bent in such a direction that a bending angle $\alpha$ is further reduced. Therefore, the lighting unit 9 is to be disposed in an upper part because the bottom side front end 13$a$ is erected. As a result, there is a problem in that wasteful space S is formed below the lighting unit 9 and a dimension H in a longitudinal direction of the whole headlamp for a vehicle is increased.

This is also opposed to a demand for reducing an opening portion in a forward part of a body in the headlamp for a vehicle, which has been a tendency in recent years. On the other hand, if the bending angle a is reduced, a height of the bottom side front end 13$a$ of the extension 13 can be reduced. However, this makes the molding hard (such that the mold releasing taper cannot be maintained), which means that productivity is reduced and manufacturing cost is increased.

One or more embodiments of the invention provide a headlamp for a vehicle which can reduce a height of a bottom side front end to lower a position in which a lighting unit is to be loaded while maintaining an excellent mold releasing property of an extension, thereby reducing a dimension in a longitudinal direction.

One or more embodiments of the invention relate to a headlamp for a vehicle comprising a lighting unit including a light source bulb and a reflector for reflecting a direct light emitted from the light source bulb in a forward direction, and an extension for covering a clearance between a lamp body and the lighting unit in a lighting chamber formed by the lamp body and a cover, wherein the extension includes a first extension having a bottom side front end taking an almost dogleg-shaped section in which a bent portion is turned in a forward direction of the vehicle and a second extension which is positioned behind the first extension and has a front edge on an internal surface of a bottom side lighting unit positioned below a rear edge of the internal surface of the lighting unit in a bottom side front end of the first extension.

In a headlamp for a vehicle in accordance with one or more embodiments of the present invention, the extension is divided into two parts including the first extension for forming a front part of a body and the second extension for forming a rear part of the body. Therefore, it is possible to easily maintain a mold releasing taper. More specifically, also in the case in which a difference between a size of an opening in the front part of the body of the extension and that of an opening in the rear part of the body is small and an inclination in a shape of a longitudinal section in a portion for connecting the front part of the body and the rear part of the body cannot be increased when integral molding is carried out, it is possible to easily maintain the respective mold releasing tapers by separating the first extension from the second extension.

Therefore, it is possible to lower a position of a rear end on the bottom side in the second extension irrespective of the shape of the bottom side front end, which has an almost dogleg-shaped section in the first extension. Even if respective ends of the first extension and the second extension take complicated shapes corresponding to a function, moreover, the respective other ends can take simple shapes so that the mold releasing can easily be carried out.

As a result, it is possible to reduce a height of the bottom side front end, thereby lowering a position in which the lighting unit is to be loaded while maintaining an excellent mold releasing property of the extension.

In a headlamp for a vehicle in accordance with one or more embodiments of the present invention, the lighting unit includes a projection lens disposed on an optical axis which is extended in a longitudinal direction of the vehicle, a light source bulb disposed behind a focal point on a rear side of the projection lens, and a reflector for reflecting the direct light emitted from the light source bulb in a forward direction close to the optical axis.

In a headlamp for a vehicle in accordance with one or more embodiments of the present invention, also in the case in which the lighting unit itself is large-sized and a reduction in a height of the lighting chamber is restricted as in a projector type lighting unit including the reflector and the projection lens, it is possible to prevent the height of the lighting chamber from being increased by lowering the position of the rear end on the bottom side in the second extension.

In a headlamp for a vehicle in accordance with one or more embodiments of the present invention, a position lamp including a light guide exposed to the internal surface of the lighting unit should be disposed on the bottom side front end of the first extension.

In a headlamp for a vehicle in accordance with one or more embodiments of the present invention, the position lamp is disposed on the bottom side front end of the extension. Also, in the case in which a reduction in a bending angle of the bottom side front end which is bent to have an almost dogleg-shaped section is restricted, consequently, the position of the rear end on the bottom side in the second extension is lowered so that it is possible to reduce a wasteful space provided below the lighting unit, thereby preventing the height of the lighting chamber from being increased.

In a headlamp for a vehicle in accordance with one or more embodiments of the present invention, the rear edge of the internal surface of the lighting unit in the bottom side front end of the first extension and the front edge of the internal surface of the lighting unit on the bottom side of the second extension should overlap with each other at a predetermined interval in the longitudinal direction of the vehicle.

In a headlamp for a vehicle in accordance with one or more embodiments of the present invention, the front edge of the second extension enters the lower part of the rear edge of the first extension at an interval and overlaps therewith. Therefore, a part of a light emitted from the projection lens is taken into the interval of the overlap portion so that a light reflected by the extension is correspondingly reduced. Thus, it is possible to reduce a glare light reflected and generated in the extension.

In the case in which the position lamp is disposed on the front end at the bottom side of the extension, moreover, a light emitted from the position lamp is irradiated as a leaking light from the interval of the overlap portion into the lighting chamber and a rendering effect is produced by an illumination function when the lighting unit is turned off. Thus, it is possible to enhance an appearance of the headlamp for a vehicle.

In a headlamp for a vehicle in accordance with one or more embodiments of the present invention, furthermore, it is desirable that a shielding portion should be formed integrally with a rear end of the second extension.

In a headlamp for a vehicle in accordance with one or more embodiments of the present invention, also in the case in which an aiming mechanism or a swivel mechanism for regulating an irradiating angle is provided and a large clearance is formed between the lighting unit and the extension, for example, the shielding portion is disposed to cross the clearance so that an inside of the lighting chamber provided below the lighting unit cannot be visually observed through the clearance from the outside of the headlamp for a vehicle. More specifically, it is possible to enhance the appearance of the headlamp for a vehicle on the outside.

In a headlamp for a vehicle in accordance with one or more embodiments of the present invention, the extension is constituted by the division into the two parts including the first extension provided with the bottom side front end which has the almost dogleg-shaped section and the second extension which is positioned behind the first extension and has the front edge positioned below the rear edge of the first extension. Even if the respective ends take complicated shapes depending on the function, therefore, the respective other ends can take simple shapes so that the mold releasing can easily be carried out.

By reducing the height of the bottom side front end to lower the position in which the lighting unit is to be loaded while maintaining an excellent mold releasing property of the extension, accordingly, it is possible to reduce a dimension in a longitudinal direction of the headlamp for a vehicle.

Other aspects and advantages of the invention will be apparent from the following description and the appended claims.

DETAILED DESCRIPTION OF THE EXEMPLARY EMBODIMENTS

Embodiments of a headlamp for a vehicle in accordance with the invention will be described below in detail with reference to the accompanying drawings. Like items in the figures are shown with the same reference numbers. In this application, a longitudinal direction of the vehicle is the direction in which a vehicle incorporating the infrared light irradiating lamp would travel, and front and forward denote a forward direction of travel of the vehicle, while behind and rear denote a backward direction of travel of the vehicle. A vertical direction is a direction perpendicular to a ground plane of the vehicle. A longitudinal direction of a filament is a direction in which the filament has the greatest length.

Figure 1:
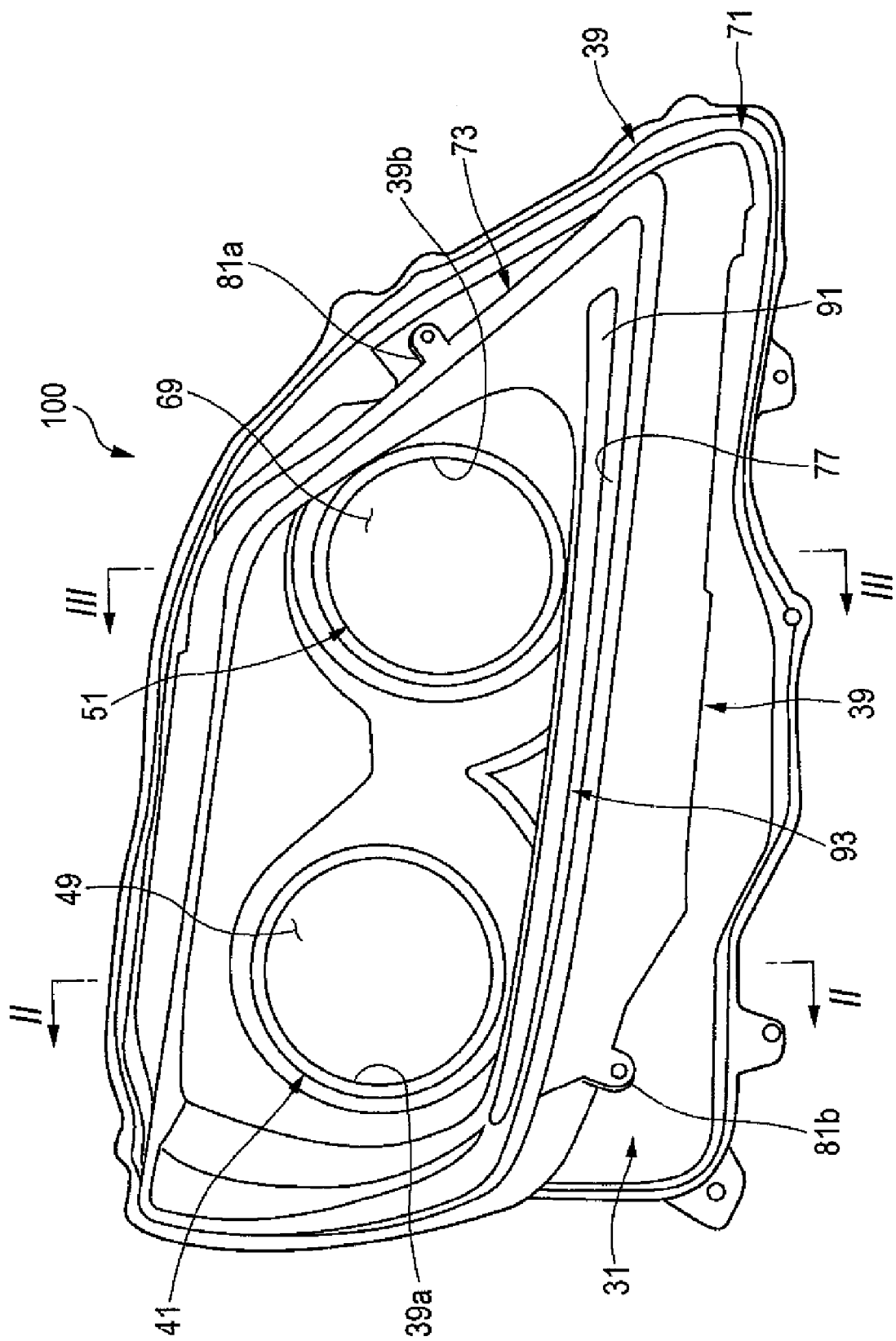
FIG. 1 is a front view showing a state in which a translucent cover of a headlamp for a vehicle according to the invention is removed.

FIG. 1 is a front view showing a state in which a translucent cover of a headlamp for a vehicle according to the invention is removed.

Figure 2:
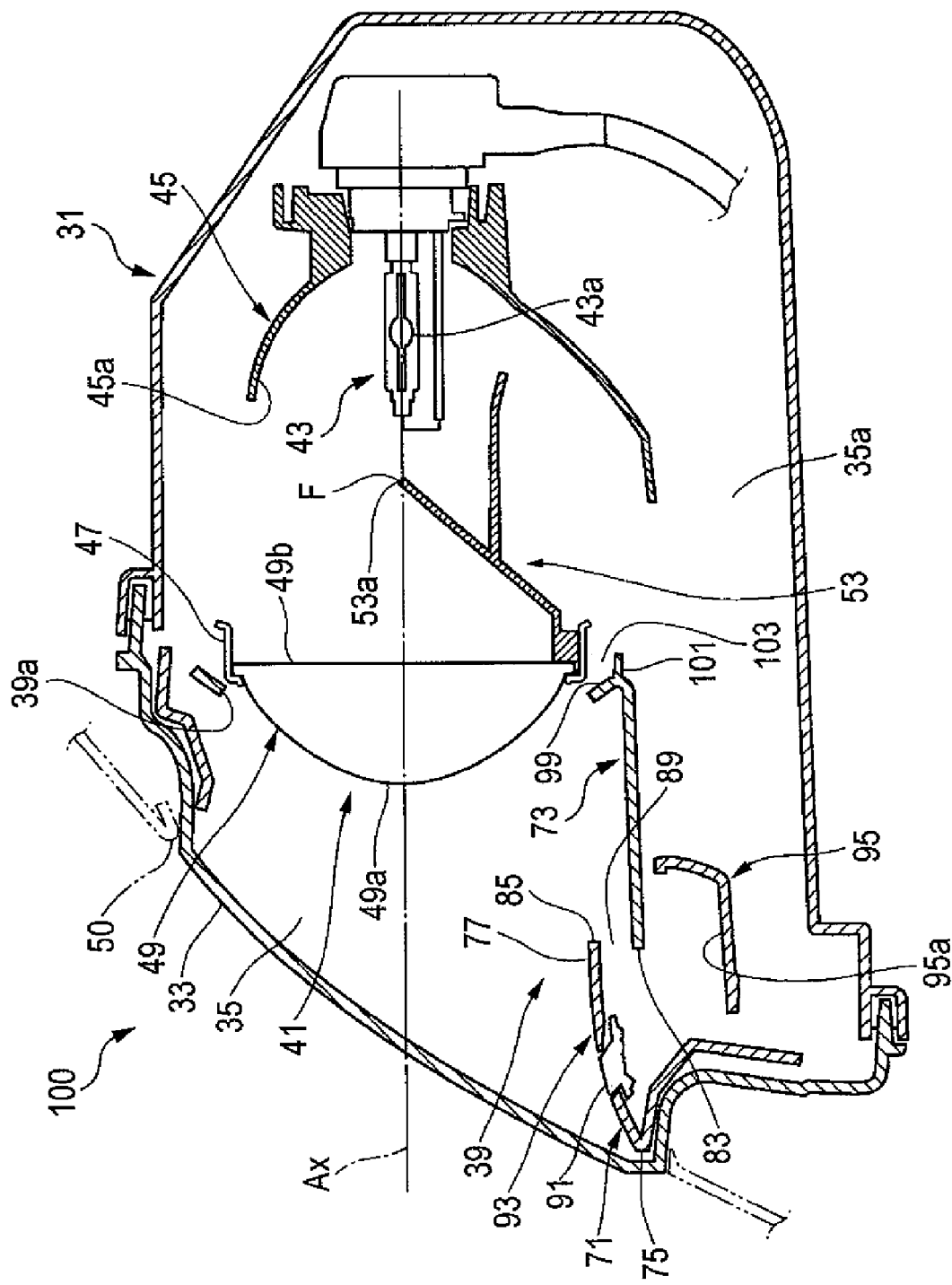
FIG. 2 is a sectional view taken along II-II in FIG. 1.
Figure 3:
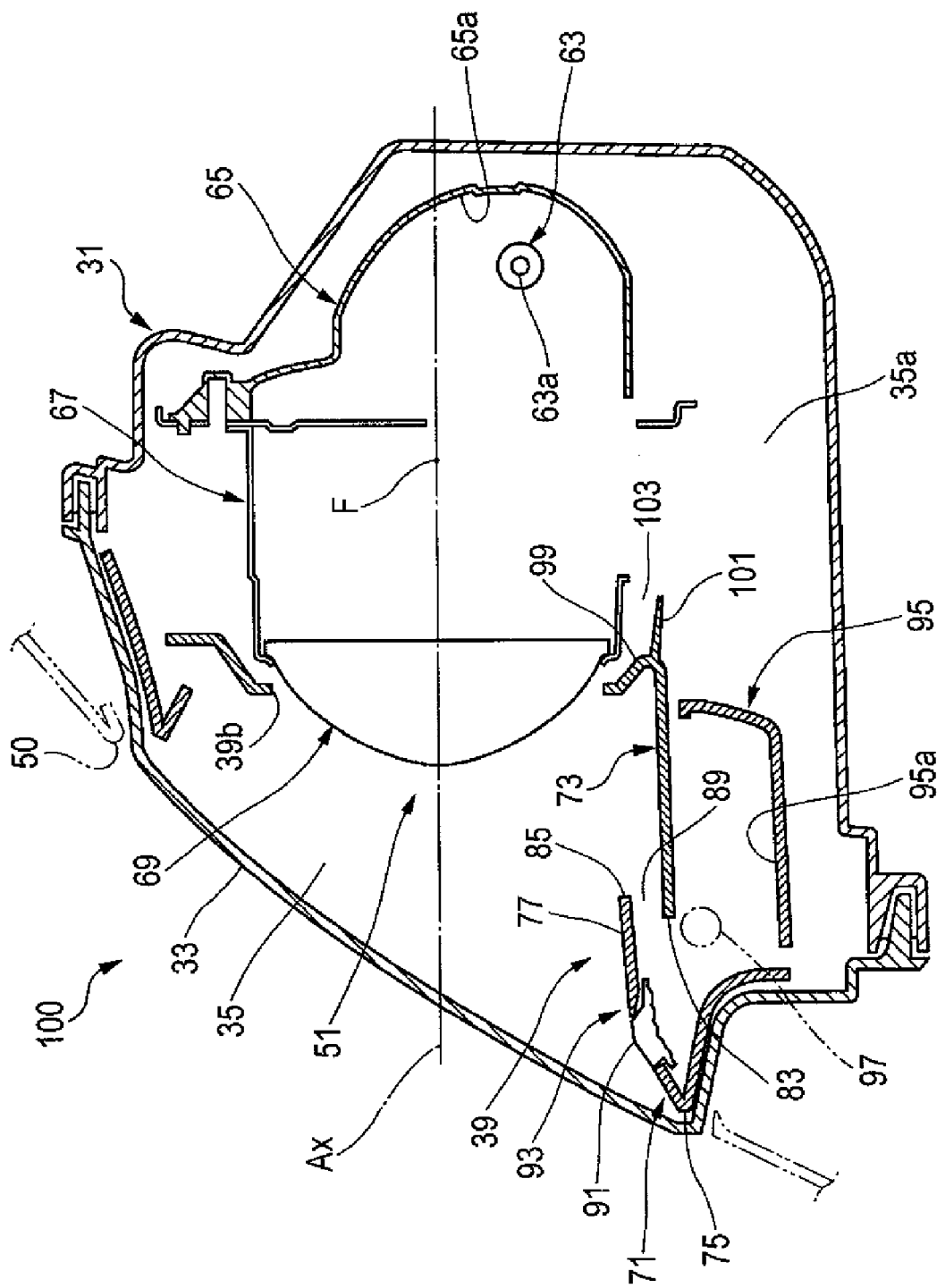
FIG. 3 is a sectional view taken along III-III in FIG. 1.

A headlamp 100 for a vehicle shown in FIGS. 1 to 3 is a lighting tool to be disposed on a right front end of a vehicle, and two lighting units 41 and 51 are accommodated to be disposed adjacently in a lateral direction in a lighting chamber 35 formed by a lamp body 31 and a translucent cover (a cover) 33 attached to an opening portion of a front end thereof.

In the headlamp 100 for a vehicle, the lighting unit 41 is turned on to form a light distribution pattern for a low beam, and furthermore, the lighting units 41 and 51 are turned on at the same time to form a light distribution pattern for a high beam.

Both of the two lighting units 41 and 51 have an optical axis Ax extended in a longitudinal direction of the vehicle and are supported tiltably in vertical and transverse directions through an aiming mechanism which is not shown. In a stage in which an aiming regulation of the aiming mechanism is completed, the optical axis Ax of the lighting unit 41 is extended in a downward direction at an angle of approximately 0.5 to 0.6 degree with respect to the longitudinal direction of the vehicle, while the optical axis Ax of the lighting unit 51 is extended in the longitudinal direction of the vehicle.

The translucent cover 33 is formed around to be provided rearward from an inside in the lateral direction toward an outside in the lateral direction along a shape of the body in a right corner portion of the front end of the vehicle, and rearward from a lower edge to an upper edge thereof. In the two lighting units 41 and 51, therefore, the lighting unit 41 positioned on the outside in the lateral direction is disposed to be shifted toward a rear side to some degree with respect to the lighting unit 51 positioned on the inside in the lateral direction.

Moreover, an extension 39, which will be described below in detail, is provided along the translucent cover 33 in the lighting chamber 35. The extension 39 is provided with opening portions 39a and 39b for surrounding the lighting units 41 and 51 in the vicinity of front ends thereof.

Next, description will be given to a structure of each of the lighting units 41 and 51.

First of all, the structure of the lighting unit 41 will be described. FIG. 2 is a sectional view taken along II-II in FIG. 1, illustrating the lighting unit 41 as a single product.

The lighting unit 41 is of a projector type and includes a light source bulb 43, a reflector 45, a lens holder 47, a projection lens 49 and a shade 53.

The projection lens 49 is constituted as a planoconvex lens in which a front side surface 49a is a convex curved surface and a rear side surface 49b is a plane, and is disposed on the optical axis Ax. The projection lens 49 serves to forward project, as an inverted image, an image on a focal plane including a focal point F on a rear side thereof. The convex curved surface constituting the front side surface 49a of the projection lens 49 is constituted by an aspherical surface formed to position the focal point F on the rear side of the projection lens 49 on the optical axis Ax.

The light source bulb 43 is a discharge bulb, such as a metal halide bulb using, a discharge light emitting portion as a light source 43a. The light source 43a is constituted as a line light source extended in a direction of a central axis of the bulb. The light source bulb 43 is inserted and fixed into an opening portion at the rear side of the reflector 45 from a rear side so as to be disposed on the optical axis Ax behind the focal point F on the rear side of the projection lens 49.

The reflector 45 has a reflecting plane 45a taking an almost elliptical spherical shape which serves to forward reflect a light emitted from the light source 43a close to the optical axis Ax. In the reflecting plane 45a, an eccentricity is set to be gradually increased from a vertical section toward a horizontal section.

Consequently, the light emitted from the light source 43a and reflected by the reflecting plane 45a is almost converged in the vicinity of the focal point F on the rear side in the vertical section, and a converging position thereof is moved considerably forward in the horizontal section. The reflector 45 is supported in the lamp body 31 through an aiming mechanism in an aiming bracket (not shown) formed in three places.

The shade 53 is fixed and supported on the lens holder 47 so as to be positioned in an almost lower half part in an internal space of the lens holder 47. The shade 53 is formed in such a manner that an upper edge 53a passes through the focal point F on the rear side of the projection lens 49. Consequently, a part of the light reflected by the reflecting plane 45a is shielded and most of an upward light emitted forward from the projection lens 49 is removed. In order to form a cutoff line of a light distribution pattern in that case, the upper edge 53a of the shade 53 is extended to be almost arcuate in a horizontal direction along the focal plane on the rear side of the projection lens 49 and is formed on a transversely double level.

The lens holder 47 is formed to be extended almost cylindrically in a double level taper in a forward direction from the opening portion on the front end of the reflector 45, and is fixed and supported on the reflector 45 at a rear end thereof, and furthermore, the projection lens 49 is fixed and supported at a front end thereof.

Next, description will be given to a structure of the lighting unit 51. FIG. 3 is a sectional view taken along III-III in FIG. 1.

In the same manner as the lighting unit 41, the lighting unit 51 is of the projector type, and includes a light source bulb 63, a reflector 65, a lens holder 67 and a projection lens 69.

Because the lighting unit 51 forms a light distribution pattern for a high beam, it does not include the shade 53 as in the lighting unit 41. However, the other structures are almost the same as those in the lighting unit 41.

The light source bulb 63 of the lighting unit 51 is inserted and fixed into an attaching opening portion of the reflector 65 from a side of the optical axis Ax.

More specifically, while the light source bulb 43 of the lighting unit 41 has the rear inserting structure, the light source bulb 63 of the lighting unit 51 has a transverse inserting structure and is inserted and fixed into the reflector 65 from a side of the optical axis Ax in a position placed apart from the optical axis Ax in a vertical direction (a position placed apart in a downward direction in the embodiment).

Therefore, a dimension in the longitudinal direction of the vehicle in the lighting unit 51 is set to be smaller than that of the lighting unit 41.

The lighting unit 51 is also supported on the lamp body 31 through an aiming mechanism in a timing bracket (not shown) formed in three places of the reflector 65.

In the headlamp 100 for a vehicle, a light distribution pattern for a low beam is formed by turning on the lighting unit 41 and a light distribution pattern for a high beam is formed by turning on the lighting units 41 and 51 at the same time. The light distribution pattern for a low beam is set to be a left light distribution and has a cutoff line on a transversely double level at an upper edge thereof. The cutoff line is extended in a horizontal direction on the transversely double level by setting, as a boundary, a line passing through a vanishing point in a direction of a front of the lighting unit in a vertical direction. An opposing lane side portion at a right side is formed as a lower stage cutoff line, and furthermore, a self-lane side portion at a left side is formed as an upper stage cutoff line on a double level through an inclined portion from the low stage cutoff line.

On the other hand, the light distribution pattern for a high beam is constituted as a synthetic light distribution pattern of the light distribution pattern for a low beam and an additional light distribution pattern formed by a light irradiation from the lighting unit 51. The additional light distribution pattern is an oblong light distribution pattern which is extended to both left and right sides, and a whole diffusing angle is slightly smaller than that in the light distribution pattern for a low beam and a hot zone thereof is formed to be much brighter than a hot zone of the light distribution pattern for a low beam.

Figure 4:
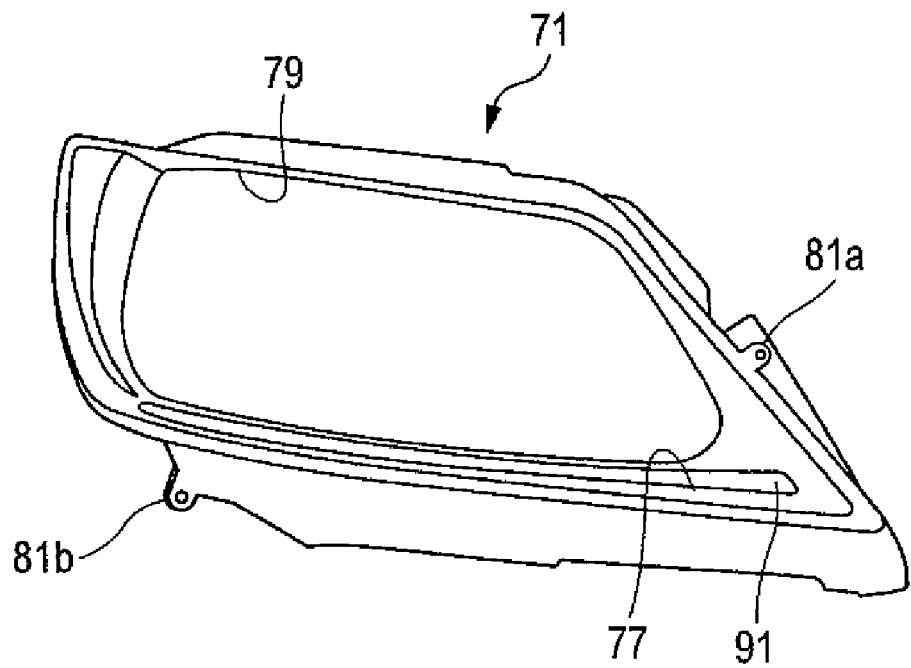
FIG. 4(a) is a front view showing a first extension and FIG. 4(b) is a front view showing a second extension illustrated in FIG. 1.
Figure 4:
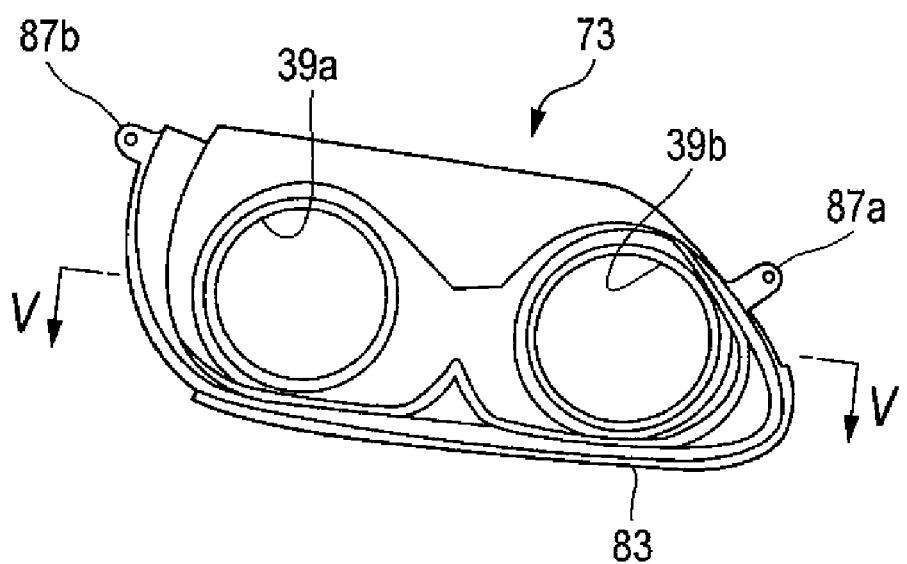
Figure 5:
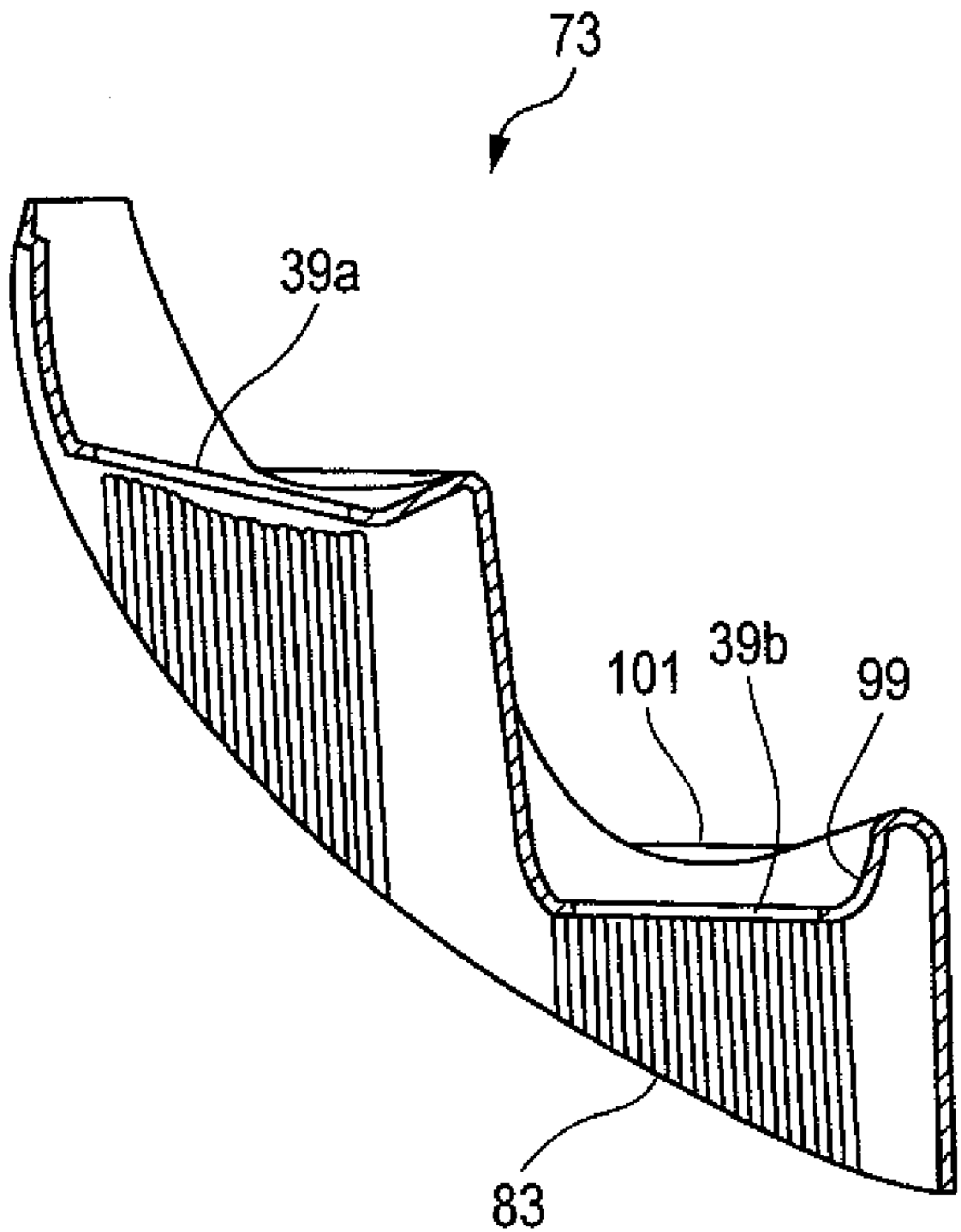
FIG. 5 is a sectional view taken along V-V in FIG. 4.
Figure 6:
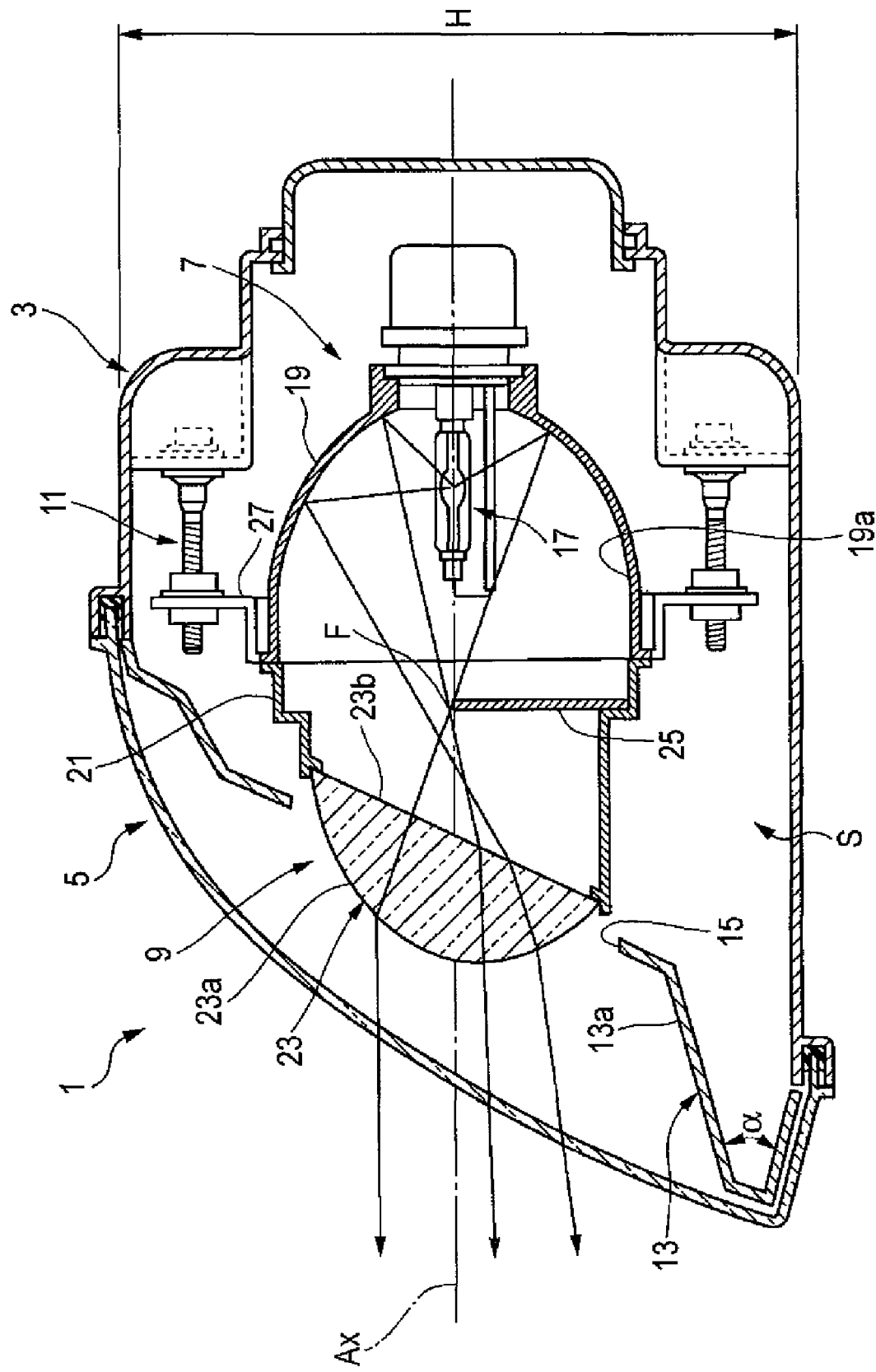
FIG. 6 is a longitudinal sectional view showing a conventional headlamp for a vehicle comprising an extension to be one sheet which is constituted integrally.

Next, description will be given to an extension 39 for covering a clearance between the lamp body 31 and the lighting units 41 and 51. FIG. 4 is a front view showing (a) a first extension and (b) a second extension illustrated in FIG. 1, and FIG. 5 is a sectional view taken along V-V in FIG. 4(b).

The extension 39 according to the embodiment is constituted by a division into a first extension 71 and a second extension 73. More specifically, the extension 39 covers the clearances between the lighting units 41 and 51 and the lamp body 31 in combination of the first extension 71 and the second extension 73.

The first extension 71 has a bottom side front end 77 having an almost dogleg-shaped section in which a bent portion 75 is turned in a forward direction of the vehicle as shown in FIGS. 2 to 4. The first extension 71 is disposed in front of the second extension 73 in the lighting chamber 35, and is molded to take a shape of a frame having an almost rectangular opening portion 79, which exposes the second extension 73. A plurality of fixing pieces 81a and 81b is protruded from an outer peripheral portion. The fixing pieces 81a and 81b are fixed to the lamp body 31 with a screw, which is not shown.

The second extension 73 is positioned behind the first extension 71 in the lighting chamber 35, and a front edge 83 on an internal surface of the lighting unit on the bottom side is positioned below a rear edge 85 on the internal surface of the lighting unit in the front end 77 on the bottom side of the first extension 71 as shown in FIGS. 2 to 4. The opening portions 39a and 39b are formed in the second extension 73. A plurality of fixing pieces 87a and 87b is also protruded from an outer periphery of the second extension 73. The fixing pieces 87a and 87b are fixed to the lamp body 31 with a screw, which is not shown.

The headlamp 100 for a vehicle according to one or more embodiments is provided with the extension 39. Consequently, the members such as the lens holders 47 and 67 and the reflectors 45 and 65 other than the projection lenses 49 and 69, and the clearances provided therebetween are not observed from an outside.

The first extension 71 and the second extension 73 are formed of plastic, and a surface in a portion observed from the outside in at least an attaching state is subjected to a bright treatment which forms an undercoat and a metal deposited film. For example, in the case in which an aluminum evaporation is carried out for the metal deposited film, a reflecting mirror is observed when the headlamp 100 for a vehicle is seen from the outside. Thus, a fine appearance can be obtained.

The extension 39 according to one or more embodiments is divided into two parts including the first extension 71 for forming the front portion of the body and the second extension 73 for forming the side portion of the body. Therefore, it is possible to easily maintain a mold releasing taper.

More specifically, also in the case in which a difference between a size of an opening in the front portion of the body and that of an opening in the rear portion of the body in the extension 39 is small because of a small opening height of a forward opening portion 50 of the body to which the headlamp 100 for a vehicle is to be attached so that an inclination of a longitudinal sectional shape in a portion for connecting the front portion of the body to the rear portion of the body cannot be increased in integral molding, for example, it is possible to easily maintain the respective mold releasing tapers by separating the first extension 71 from the second extension 73.

Irrespective of the shape of the bottom side front end 77 having the almost dogleg-shaped section in the first extension 71, it is possible to lower a position of a rear end 99 on the bottom side in the second extension 73. Even if the respective ends (the bent portion 75 and the rear end 99) of the first extension 71 and the second extension 73 take complicated shapes depending on a function, the respective other ends (the rear edge 85 and the front edge 83) can take simple shapes and the respective mold releasing can easily be carried out.

As a result, in the headlamp 100 for a vehicle according to the embodiment, it is possible to reduce the height of the bottom side front end 77 to lower the positions in which the lighting units 41 and 51 are to be loaded in the lighting chamber 35 while maintaining the excellent mold releasing property of the extension 39.

Furthermore, the lighting units 41 and 51 according to one or more embodiments are lighting units of a projector type, which comprise the reflectors 45 and 65 and the projection lenses 49 and 69 respectively, and the lighting units themselves are large-sized and a reduction in the height of the lighting chamber 35 is restricted. By lowering the position of the rear end 99 on the bottom side in the second extension 73, however, it is possible to prevent the height of the lighting chamber 35 from being increased.

Moreover, the rear edge 85 on the internal surface of the lighting unit in the bottom side front end 77 of the first extension 71 overlaps with the front edge 83 on the internal surface of the lighting unit at the bottom side of the second extension 73 at a predetermined interval 89 in the longitudinal direction of the vehicle.

More specifically, the front edge 83 of the second extension 73 enters the lower part of the rear edge 85 in the first extension 71 with the interval 89 and overlaps therewith. Therefore, a part of the lights emitted from the projection lenses 49 and 69 is taken into the interval 89 of the overlapping portion. Correspondingly, the light reflected from the extension 39 is lessened. Thus, it is possible to reduce a glare light generated by the reflection through the extension 39.

Furthermore, the bottom side front end 77 of the first extension 71 according to one or more embodiments is provided with a position lamp 93 including a light guide 91 exposed to the internal surface of the lighting unit.

A reflector 95 for the position lamp is provided below the second extension 73. The reflector 95 for the position lamp reflects a light emitted from a lamp light source 97 to the light guide 91 through a reflecting plane 95a of the reflector 95 for the position lamp.

When the position lamp 93 is turned on, the light emitted from the lamp light source 97 is incident on the light guide 91 and is emitted in a line below the lighting units 41 and 51.

As described above, according to the headlamp 100 for a vehicle in which the extension 39 is constituted by the division into the first extension 71 and the second extension 73, the position lamp 93 is disposed on the bottom side front end 77 of the extension 39. Also in the case in which a reduction in a bending angle of the bottom side front end 77 bent to have the almost dogleg-shaped section is restricted, consequently, it is possible to reduce a wasteful space below the lighting units 41 and 51 to prevent the height of the lighting chamber 35 from being increased by lowering the position of the rear end 99 on the bottom side in the second extension 73.

Moreover, a light emitted from the position lamp 93 disposed on the bottom side front end 77 of the first extension 71 is irradiated as a leaking light from the interval 89 of the overlap portion into the lighting chamber 35 and a rendering effect is produced by an illumination function when the lighting units 41 and 51 are turned off. Thus, it is possible to enhance an appearance of the headlamp 100 for a vehicle.

Furthermore, a shielding portion 101 is extended rearward and is formed integrally with the rear end 99 of the second extension 73.

Also, in the case in which the lighting units 41 and 51 are supported through an aiming mechanism or a swivel mechanism (not shown) in such a manner that an irradiating angle can be regulated and a large clearance 103 is formed between the lighting units 41 and 51 and the second extension 73, the shielding portion 101 is disposed to cross the clearance 103 so that an inside of a lighting chamber 35a provided below the lighting units 41 and 51 cannot be visually observed through the clearance 103 from the outside of the headlamp 100 for a vehicle. More specifically, it is possible to enhance the appearance of the headlamp 100 for a vehicle on the outside.

According to the headlamp 100 for a vehicle in accordance with one or more embodiments, even if the shielding portion 101 is provided so that the rear end 99 of the second extension 73 takes a complicated shape, the front edge 83 of the second extension 73 can take a simple shape. Consequently, it is possible to easily carry out molding without complicating the mold releasing.

In the headlamp 100 for a vehicle in accordance with one or more embodiments of the present invention, it is possible to reduce a dimension in the longitudinal direction of the headlamp 100 for a vehicle by reducing the height of the bottom side front end 77 to lower the positions in which the lighting units 41 and 51 are to be loaded while maintaining the excellent mold releasing property of the extension 39.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

Description of the Reference Numerals and Signs

31 . . . lamp body
33 . . . translucent cover (cover)
35 . . . lighting chamber
39 . . . extension
41, 51 . . . lighting unit
43 . . . light source bulb
45, 65 . . . reflector
49, 69 . . . projection lens
71 . . . first extension
73 . . . second extension
75 . . . bent portion
77 . . . bottom side front end
83 . . . front edge
85 . . . rear edge
89 . . . interval
91 . . . light guide
93 . . . position lamp
99 . . . rear end of second extension
100 . . . headlamp for vehicle
101 . . . shielding portion
Ax . . . optical axis
F . . . focal point on rear side

What is claimed is:

1. A headlamp for a vehicle comprising:
a lighting unit comprising a light source, and
a reflector for reflecting a direct light emitted from the light source in a forward direction; and
an extension for covering a clearance between a lamp body and the lighting unit in a lighting chamber formed by the lamp body and a cover, wherein
the extension comprises a first extension comprising a bottom side front end taking a substantially dogleg-shaped section in which a bent portion is turned in a forward direction of the vehicle, and
a second extension positioned behind the first extension and comprising a front edge positioned below a rear edge of the bottom side front end of the first extension, and
the rear edge of the bottom side front end of the first extension and the front edge of the second extension overlap with each other at a predetermined interval in the longitudinal direction of the vehicle.

2. The headlamp for a vehicle according to claim 1, wherein
the lighting unit comprises a projection lens disposed on an optical axis, which is extended in a longitudinal direction of the vehicle,
the light source comprises a light source bulb disposed behind a focal point on a rear side of the projection lens, and
the reflector reflects the direct light emitted from the light source in a forward direction close to the optical axis.

3. The headlamp for a vehicle according to claim 2, wherein a position lamp including a light guide exposed to the internal surface of the lighting unit is disposed on the bottom side front end of the first extension.

4. The headlamp for a vehicle according to claim 3, wherein a shielding portion is formed integrally with a rear end of the second extension.

5. The headlamp for a vehicle according to claim 2, wherein a shielding portion is formed integrally with a rear end of the second extension.

6. The headlamp for a vehicle according to claim 1, wherein a shielding portion is formed integrally with a rear end of the second extension.

7. A headlamp for a vehicle comprising:
a lighting unit comprising a light source, and
a reflector for reflecting a direct light emitted from the light source in a forward direction; and
an extension for covering a clearance between a lamp body and the lighting unit in a lighting chamber formed by the lamp body and a cover, wherein
the extension comprises a first extension comprising a bottom side front end taking a substantially dogleg-shaped section in which a bent portion is turned in a forward direction of the vehicle,
a second extension positioned behind the first extension and comprising a front edge positioned below a rear edge of the bottom side front end of the first extension, and
a position lamp including a light guide exposed to the internal surface of the lighting unit is disposed on the bottom side front end of the first extension.

8. The headlamp for a vehicle according to claim 7, wherein the rear edge of the bottom side front end of the first extension and the front edge of the second extension overlap with each other at a predetermined interval in the longitudinal direction of the vehicle.

9. The headlamp for a vehicle according to claim 8, wherein a shielding portion is formed integrally with a rear end of the second extension.

10. The headlamp for a vehicle according to claim 7, wherein a shielding portion is formed integrally with a rear end of the second extension.

11. A headlamp for a vehicle comprising:
a lamp body and a cover that fit together to form a lighting chamber;
a lighting unit disposed within the lighting chamber; and
an extension for covering a clearance between the lamp body and the lighting unit, wherein
the extension comprises a first extension comprising a bottom side front end taking a substantially dogleg-shaped section in which a bent portion is turned in a forward direction of the vehicle, and
a second extension positioned behind the first extension and comprising a front edge positioned below a rear edge of the bottom side front end of the first extension, and
the rear edge of the bottom side front end of the first extension and the front edge of the second extension overlap with each other at a predetermined interval in the longitudinal direction of the vehicle.

* * * * *